United States Patent [19]
Shiba

[11] Patent Number: 5,299,576
[45] Date of Patent: Apr. 5, 1994

[54] ULTRASONIC SYNTHETIC APERTURE DIAGNOSTIC APPARATUS

[75] Inventor: Akira Shiba, Kawasaki, Japan

[73] Assignee: Fujitsu Limited, Kawasaki, Japan

[21] Appl. No.: 978,404

[22] Filed: Nov. 18, 1992

[30] Foreign Application Priority Data

Nov. 29, 1991 [JP] Japan ................................. 3-316679

[51] Int. Cl.[5] .............................................. A61B 8/00
[52] U.S. Cl. .................................. 128/660.07; 73/625
[58] Field of Search ............... 128/660.07, 653, 661.01; 73/625; 356/136; 364/413.07, 413.25, 515

[56] References Cited

U.S. PATENT DOCUMENTS 4,371,895 2/1983 Koga .................................... 358/136
5,150,292 9/1992 Hoffman et al. ....................... 128/654

FOREIGN PATENT DOCUMENTS 0083107 7/1983 European Pat. Off. .

OTHER PUBLICATIONS

IEEE '90 Ultrasonics Symposium Proceedings, vol. 3, L. F. Nock et al. 'Synthetic aperture imaging in medical ultrasound with correction for motion artefacts'.
JP A 58 186 068 (Hitachi) 20 Oct. 1983.
Proceedings of the IEEE, New York US pp. 748–749.
IEEE Transactions on Ultrasonics, Ferroelectrics and Frequency Control, vol. 35, No. 6, Nov., 1988, New York, US pp. 828–838.

Primary Examiner—Francis Jaworski
Attorney, Agent, or Firm—Armstrong, Westerman, Hattori, McLeland & Naughton

[57] ABSTRACT

The present invention relates to an ultrasonic synthetic aperture diagnostic apparatus which detects information concerning an internal structure of an object to be examined by making each of a plurality of arranged transducers sequentially emits an ultrasonic pulse signal into the object in turn, receiving each ultrasonic echo reflected by the internal structure of the object by the plurality of transducers in each ultrasonic scanning cycle, and obtaining information concerning the internal structure of the object on the basis of input signals provided by the plurality of transducers. The present invention is intended to provide an ultrasonic synthetic aperture diagnostic apparatus capable operating at a high frame rate and of forming a clear picture of high quality even if the object is moving. The ultrasonic synthetic aperture diagnostic apparatus comprises a displacement measuring means which determines displacement vectors indicating the displacements of the picture elements between two focused input pictures obtained in two ultrasonic scanning cycles for a plurality of focused input pictures, and a displacement integrating means which determines integrated displacement vectors indicating the displacements of the picture elements of a focused input picture from those of a predetermined reference focused input picture by integrating displacement vectors of the corresponding picture elements in a plurality of focused input pictures.

10 Claims, 15 Drawing Sheets

ULTRASONIC SYNTHETIC APERTURE DIAGNOSTIC APPARATUS

BACKGROUND OF THE INVENTION

1. Field of the Invention

The present invention relates to an ultrasonic synthetic aperture diagnostic apparatus capable of detecting the internal information of an object to be examined by successively sending ultrasonic pulse signals into the object by a plurality of transducers, receiving reflected ultrasonic waves reflected by an internal structure of the object by the plurality of transducers every time an ultrasonic pulse signal is sent into the object and detecting the internal information of the object on the basis of the received ultrasonic waves.

2. Description of the Related Art

An ultrasonic diagnostic apparatus has been widely used for diagnosing diseases. The ultrasonic diagnostic apparatus emits ultrasonic waves into a test object, particularly, a human body, receives ultrasonic echoes reflected by an internal structure of the object, converts the received ultrasonic echoes into corresponding input signals and forms an image of the internal structure for diagnosis on the basis of information represented by the input signals.

Referring to FIG. 13 showing a prior art ultrasonic diagnostic apparatus, a probe pulse signal transmitted by a transmitter, not shown, is applied through an amplifier 10 and a probe signal focusing means 12 to transducers 2 included in an ultrasonic probe 1. Then, each transducer 2 emits an ultrasonic pulse signal into an object. Since the delay of the probe pulse signal applied to each transducer 20 is controlled by the probe signal focusing means 12, the ultrasonic pulse signal emitted by each transducer 2 forms an ultrasonic pulse beam, i.e., a probe beam-1 or a probe beam-2, that is focused on a position at a predetermined depth in the object. A delaying pattern in which the probe signal focusing means 12 delays the probe pulse signal is varied to shift the ultrasonic pulse beam in the direction of the arrow shown in FIG. 13 for scanning. The ultrasonic pulse beam is reflected by the internal structure of the object, the ultrasonic echoes reflected by the internal structure of the object are received by the transducers 2, and then the ultrasonic echoes are converted into input signals.

Received signal focusing means 14 delay the input signals provided by the transducers 2 to provide input signals corresponding to the ultrasonic echoes reflected by the same point in the object at the same time simultaneously, and then an adder adds the input signals.

A delay pattern in which the received signal focusing means 14 delay the input signals is varied to execute scanning on the receiving side in synchronism with dynamic focusing in which point on which the input signal is focused is changed sequentially and the scanning action of the ultrasonic pulse beam on the basis of a fact that the ultrasonic wave reflected by a deeper point in the object arrives rater at the transducer 2.

The output signals of the adder 16 are converted into corresponding logarithmic signals by a logarithmic converter 18, the logarithmic signals are detected by a detector 20. Then, the output signals of the detector 20 are converted into image signals representing an image to be displayed on a display 26 by a digital scan converter 22 and the image signals are stored temporarily in a frame memory 24. The image signals are read from the frame memory 24 and sent to the display 26, such as a CRT, to display an image of an internal structure of the object on the display 26 for diagnosis.

With respect to the prior art ultrasonic diagnostic apparatus, several ultrasonic pulse beams which are controlled to focus at several different depth points in the object are needed to make each scanning line. And many scanning lines are needed to make each picture. Therefore#the number of pictures, i.e., the number of frames, which can be formed in unit time is relatively small.

Suppose, for example, that ultrasonic pulse signals are emitted at intervals of 200 μsec, the number of the transducers 2 is 128, the number of scanning lines is 128, a maximum depth is 15 cm, and focusing pitch in the direction of depth is 2 cm. Then, frame rate, i.e. the number of frames per unit times is as small as 4 frames/sec. Therefore, the current ultrasonic diagnostic apparatus sacrifices picture quality for increasing the frame rate.

Efforts have been made to obtain the three-dimensional information of an internal structure of an object by using transducers arranged in a two-dimensional matrix. However, if the number of the transducers is $32 \times 32 = 1024$, the number of scanning lines is $64 \times 64 = 4096$ and scanning pitch in the direction of depth is 2 cm, frame rate is only 0.14 frames/sec, which is far below a practical level.

An ultrasonic synthetic aperture diagnostic apparatus is one of means proposed to solve such a problem.

FIG. 14 is a diagrammatic view of the previously proposed ultrasonic synthetic aperture diagnostic apparatus and FIG. 15 is a diagrammatic view of assistance in explaining the mode of operation of the ultrasonic synthetic aperture diagnostic apparatus. In FIG. 14, parts like of corresponding to those of the ultrasonic diagnostic apparatus shown in FIG. 13 are denoted by the same reference characters.

Referring to FIGS. 14 and 15, a probe pulse signal transmitted by a transmitter, not shown, is transferred through an amplifier 10 and a switching circuit 28 to transducers 2. Accordingly, the probe pulse signal is applied to one of the M transducers 2 at a time. Suppose that the probe pulse signal is applied to the first transducer 2, i.e., the top transducer 2 in FIG. 14, as shown in FIG. 14. Then, the first transducer 2 emits a ultrasonic pulse signal into the object.

The ultrasonic pulse signal is reflected by the internal structure of the object, represented by a reflecting point in FIG. 14. The M transducers 2 receive the reflected ultrasonic wave and provide input signals. M A/D converters 30 sample N input signals corresponding to the reflected ultrasonic waves reflected, respectively, by reflecting points at different depths and converts the N input signals into digital input signals. The digital input signals are stored temporarily in M memories 32. Then, the digital input signals are read from the M memories 32, delayed and added by an input signal focusing means 34 so that R picture elements with respect to the direction of depth in a desired region in the object and Q picture elements (Q scanning lines) with respect to the direction of arrangement of the transducers 2 are formed to form a focused input picture. The focused input picture is given through an adder 36 to and stored in a memory 38.

The switching circuit 28 is set for the second transducer 2, i.e., the second transducer 2 from the top, to emit the ultrasonic pulse signal by the second transducer 2 to make the input signal focusing means 34 provides the next focused input picture by the foregoing procedure. Since the focused input picture obtained in the last ultrasonic scanning cycle is stored in the memory 38, the adder 36 adds the picture elements of the focused input picture previously stored in the memory 38 and the corresponding picture elements of the focused input picture obtained in this ultrasonic scanning cycle, and the focused input picture previously stored in the memory 38 is replaced with a focused input picture obtained by the addition of the picture elements of the successive focused input pictures is stored in the memory 38.

Thus, the M transducers 2 are actuated successively and the focused input picture forming procedure including emission of a ultrasonic pulse signal, reception of the reflected ultrasonic pulse signal and formation of a focused input picture is repeated as shown in FIG. 15 to obtain a display RF data representing the addition of M focused input pictures.

The display RF data is transferred, similarly to the transfer of the input signal in the operation of the ultrasonic diagnostic apparatus, through a logarithmic converter 18, a detector 20 and a digital scan converter 22 to and stored temporarily in a frame memory 24. A tomogram of an internal structure of the object generated on the basis of the display RF data is displayed on a display 26.

The ultrasonic synthetic aperture diagnostic apparatus is capable of operating at a very high frame rate. For example, if the ultrasonic pulse signal is emitted at intervals of 240 μsec, the number M of the transducers 2 is 128, the number of scanning lines is 128 and a maximum depth is 15 cm, the frame rate is 32 frames/sec, which is far higher than the frame rate of 4 frames/sec of the prior art ultrasonic diagnostic apparatus. If the ultrasonic synthetic aperture diagnostic apparatus is provided with 32×32=1024 transducers arranged in a two-dimensional matrix for three-dimensional measurement, the frame rate is 4 frames/sec, which is far higher than the frame rate of 0.14 frames/sec of the prior art ultrasonic diagnostic apparatus.

However, since the transducers 2 of the ultrasonic synthetic aperture diagnostic apparatus emit ultrasonic pulse signals at different times, respectively, the ultrasonic synthetic aperture diagnostic apparatus is able to form a clear picture of a stationary object only. For example, in forming a tomogram of an internal structure of an object, the ultrasonic synthetic aperture diagnostic apparatus cannot be satisfactorily focused because the internal structure is caused to move inevitably by the breathing action of the lung and the pulsation of the heart. Accordingly, the tomogram of an internal structure of an object formed by the ultrasonic synthetic aperture diagnostic apparatus is inferior in quality to that formed by the prior art ultrasonic diagnostic apparatus and hence the ultrasonic synthetic aperture diagnostic apparatus has not been applied to practical uses.

Furthermore, since the ultrasonic synthetic aperture diagnostic apparatus synthesizes the display data by calculation after the completion of sequential emission of the ultrasonic pulse signals by the transducers, the ultrasonic synthetic aperture diagnostic apparatus has difficulty in detecting the minute movement of tissues and the velocity of a blood stream by the Doppler analysis.

Still further, it has been impossible to detect a blood stream flowing in a direction perpendicular to the direction of travel of the ultrasonic beam by the Doppler analysis.

SUMMARY OF THE INVENTION

In view of the foregoing circumstances pertaining to the prior art, it is a first object of the present invention to provide an ultrasonic synthetic aperture diagnostic apparatus capable of operating at a high frame rate and of obtaining a clear picture of a moving object.

A second object of the present invention is to provide an ultrasonic synthetic aperture diagnostic apparatus capable of detecting displaying the movement of an internal structure to be inspected without using the Doppler analysis.

A third object of the present invention is to provide an ultrasonic synthetic aperture diagnostic apparatus capable of detecting and displaying the flow of a fluid in an object to be inspected regardless of the direction of flow without using the Doppler analysis.

An ultrasonic synthetic aperture diagnostic apparatus in accordance with the present invention, which detects information concerning an internal structure of an object to be examined by sequentially making a plurality of transducers arranged in an array emit an ultrasonic pulse signal into the object, receiving each ultrasonic echo reflected by the internal structure by the plurality of transducers, and obtaining the information on the basis of input signals provided by the plurality of transducers, comprises, as basic components:

(a) an input signal focusing means which forms a focused input picture of the entire area of a desired field of view within the object on the basis of the input signals provided by the transducers in each ultrasonic scanning cycle;

(b) a displacement measuring means which determines displacement vectors indicating the displacements of the picture elements between two successive focused input pictures obtained in two ultrasonic scanning cycles for a plurality of focused input pictures; and (c) a displacement integrating means which determines integrated displacement vectors indicating the displacements of the picture elements of a focused input picture from those of a predetermined reference focused input picture by integrating displacement vectors of the corresponding picture elements in a plurality of focused input pictures.

The algorithm by which the displacement measuring means stated in (b) determines the displacement vector is not limited to a particular algorithm. For example, a displacement vector for each picture element may be determined from the coordinates of the maximum value of cross-correlation between the corresponding picture elements of two focused input pictures determined through the calculation of cross-correlation or may be determined through the calculation of optical flow between two focused input pictures.

An ultrasonic synthetic aperture diagnostic apparatus in a first aspect of the present invention intended to achieve the first object of the invention comprises, in addition to the basic components (a), (b) and (d):

(d) a displacement correcting means which corrects the displacement of each picture element of each focused input picture with reference to the predetermined focused input picture to obtain displacement-corrected focused input pictures;

(e) a picture integrating means which provides an integrated picture by integrating the displacement-corrected focused input pictures; and (f) a integrated picture displaying means which displays the integrated picture.

An ultrasonic synthetic aperture diagnostic apparatus in a second aspect of the present invention intended to achieve the second object of the present invention comprises, in addition to the basic components (a), (b) and (c):

(g) an integrated displacement displaying means which displays data determined on the basis of the integrated displacement vectors.

The data determined on the basis of the integrated displacement vector may represent either both the magnitude and the direction of the integrated displacement vector or either the magnitude or the direction of the integrated displacement vector. When displaying the data determined on the basis of the integrated displacement vector, all the data for the entire area of the picture need not be necessarily displayed; only the data for several points on the picture may be displayed or the movement of only one point in the picture may be displayed.

An ultrasonic synthetic aperture diagnostic apparatus in a third aspect of the present invention intended to achieve the third object of the present invention comprises, in addition to the basic components (a), (b) and (c):

(h) an amplitude difference extracting means which obtains a plurality of amplitude difference pictures by sequentially extracting information representing the amplitude difference between the corresponding picture elements of the two displacement-corrected focused input pictures from the plurality of focused input pictures;

(i) an amplitude difference picture integrating means which obtains an integrated amplitude difference picture by integrating the plurality of displacement-corrected amplitude difference pictures; and (j) an integrated amplitude difference picture displaying means which displays the integrated amplitude difference picture.

To obtain each amplitude difference picture by the ultrasonic synthetic aperture diagnostic apparatus in the third aspect of the present invention, the displacements of only the two focused input pictures relevant to the calculation of each amplitude difference picture need to be corrected and the displacements of all the focused input pictures need not be corrected. However, the displacements of a plurality of integrated amplitude difference pictures to be integrated must be corrected to obtain the integrated amplitude difference picture. Accordingly, the ultrasonic synthetic aperture diagnostic apparatus may form an integrated amplitude difference picture by correcting the displacements of the two focused input pictures on the basis of the displacement vectors to obtain each amplitude difference picture and correcting the displacements of the plurality of integrated amplitude difference pictures on the basis of the integrated displacement vectors or may form an integrated amplitude difference picture by correcting the displacements of the plurality of integrated amplitude difference pictures on the basis of the displacement vectors to obtain each amplitude difference picture and omitting the correction of displacement.

An ultrasonic synthetic aperture diagnostic apparatus may be a combination of any two of or all the foregoing ultrasonic synthetic aperture diagnostic apparatuses in the first, second and third aspects of the present invention, that is, an ultrasonic synthetic aperture diagnostic apparatus in a fourth aspect of the present invention comprises, in addition to the basic components (a), (b) and (c):

at least either (k) an integrated picture calculating means comprising the components (d) and (e), or (l) an integrated amplitude difference picture calculating means comprising the components (h) and (i); and (m) a composite picture displaying means for displaying two pieces or all pieces of information among the integrated picture obtained by (e) the picture integrating means, data based on the integrated displacement vectors obtained by (c) the displacement integrating means, and the integrated amplitude difference picture obtained by (i) the amplitude difference picture integrating means, in a superposed picture.

The ultrasonic synthetic aperture diagnostic apparatus in accordance with the present invention forms each focused input picture by (a) the input signal focusing means in each ultrasonic scanning cycle, measures the displacement vectors of each picture element, each representing the displacement of the corresponding picture elements between two focused input pictures obtained in two ultrasonic scanning cycles sequentially for a plurality of focused input pictures, and obtains an integrated displacement vector by integrating the displacement vectors of each picture element in the plurality of focused input pictures by (c) the displacement integrating means. Accordingly, the movement of each picture element during the sequential emission of ultrasonic pulse signals by the transducers caused by, for example, the breathing action of the lung or the pulsation of the heart can be represented by the integrated displacement vector.

The ultrasonic synthetic aperture diagnostic apparatus in accordance with the present invention corrects the displacement of each picture element in the focused input pictures on the basis of the integrated displacement vector thus determined with reference to a predetermined focused input picture ((d)), obtains an integrated picture by integrating the displacement-corrected focused input pictures, the displacement of each picture element of which being corrected, ((e)), and displays the integrated picture ((f)). Accordingly, the displacement of each picture element attributable to the movement of the object to be inspected is corrected, so that a picture of satisfactory quality as clear as that of a stationary object can be displayed.

Since the mode of operation in which the transducers emit ultrasonic pulse signals sequentially and the ultrasonic echo of the ultrasonic pulse signal emitted by each transducer is received by all the transducers is the same as that of the prior art ultrasonic synthetic aperture diagnostic apparatus and hence the ultrasonic synthetic aperture diagnostic apparatus is capable of operating at a high frame rate as well as the prior art ultrasonic synthetic aperture diagnostic apparatus.

The ultrasonic synthetic aperture diagnostic apparatus in the second aspect of the present invention displays ((g)) the data based on the integrated displacement vector. Therefore, the ultrasonic synthetic aperture diagnostic apparatus is capable of detecting and displaying the movement (minute displacement) of an internal structure of the object without employing the Doppler analysis.

The ultrasonic synthetic aperture diagnostic apparatus in the third aspect of the present invention obtains a plurality of amplitude difference pictures ((h)) by sequentially extracting information representing the amplitude difference between the corresponding picture elements of two displacement-corrected focused input pictures successively for a plurality of focused input pictures. Since each amplitude difference picture is the picture of "the difference" between the two displacement-corrected focused input pictures, nothing appears in the picture of "the difference" if the displacement of each picture element is corrected accurately. However, since the ultrasonic waves reflected by the fluid within the object, such as the blood, is very weak, the displacement of each picture element caused by the flow of the fluid is not corrected and remains as "an error" in displacement correction in the amplitude difference picture.

The ultrasonic synthetic aperture diagnostic apparatus in the third aspect of the present invention uses the error in displacement correction and obtains the integrated amplitude difference picture ((i)) by integrating a plurality of amplitude difference pictures and displays the integrated amplitude difference picture ((j)). Thus, the ultrasonic synthetic aperture diagnostic apparatus is capable of detecting the flow of the fluid within the object regardless of the direction of flow of the fluid without using the Doppler analysis and of displaying the flow of the fluid.

Since the ultrasonic synthetic aperture diagnostic apparatus in the fourth aspect of the present invention displays two pieces or three pieces of information among the integrated picture, the data based on the integrated displacement vector and the integrated amplitude difference picture in a superposed picture ((m)), a picture constructed by superposing, for example, a tomogram in which the movement of each picture element is corrected, the movement of parts of the object, and/or blood streams can be displayed to further facilitate understanding the information for observation and diagnosis.

As mentioned above, the ultrasonic synthetic aperture diagnostic apparatus in the first aspect of the present invention forms a focused input picture for each ultrasonic scanning cycle, measures the displacement vector of each picture element representing the displacement of the picture element between two successive received-and-focused pictures formed by two ultrasonic scanning cycles for a plurality of focused input pictures, determines an integrated displacement vector by integrating the displacement vectors each representing the displacement of each picture element in the plurality of focused input pictures, corrects the displacement of each focused input picture on the basis of the integrated displacement vector to obtain a displacement-corrected focused input pictures, forms an integrated picture by integrating the displacement-corrected focused input pictures, and displays the integrated picture. Accordingly, the ultrasonic synthetic aperture diagnostic apparatus is capable of operating at a high frame rate as well as the prior art ultrasonic synthetic aperture diagnostic apparatus, of correcting the movement of the object and of displaying the integrated picture clearly in satisfactory quality as well as a picture of a stationary object.

The ultrasonic synthetic aperture diagnostic apparatus in the second aspect of the present invention displays the data based on the integrated displacement vector and hence the ultrasonic synthetic aperture diagnostic apparatus is capable of displaying minute displacement of points in the object without using the Doppler analysis.

The ultrasonic synthetic aperture diagnostic apparatus in the third aspect of the present invention forms and displays the integrated amplitude difference picture instead of the integrated picture and hence is capable of displaying the flow of the fluid within the object regardless of the direction of flow of the fluid without using the Doppler analysis.

The ultrasonic synthetic aperture diagnostic apparatus in the fourth aspect of the present invention displays is constructed by combining at least two of the ultrasonic synthetic aperture diagnostic apparatuses in the first, second and third aspect of the present invention and displays at least two pieces or all pieces of information among the integrated picture, the data based on the integrated displacement vector and the integrated amplitude difference picture in a superposed picture, which further facilitates understanding the information for observation and diagnosis.

DESCRIPTION OF THE PREFERRED EMBODIMENTS

Figure 1:
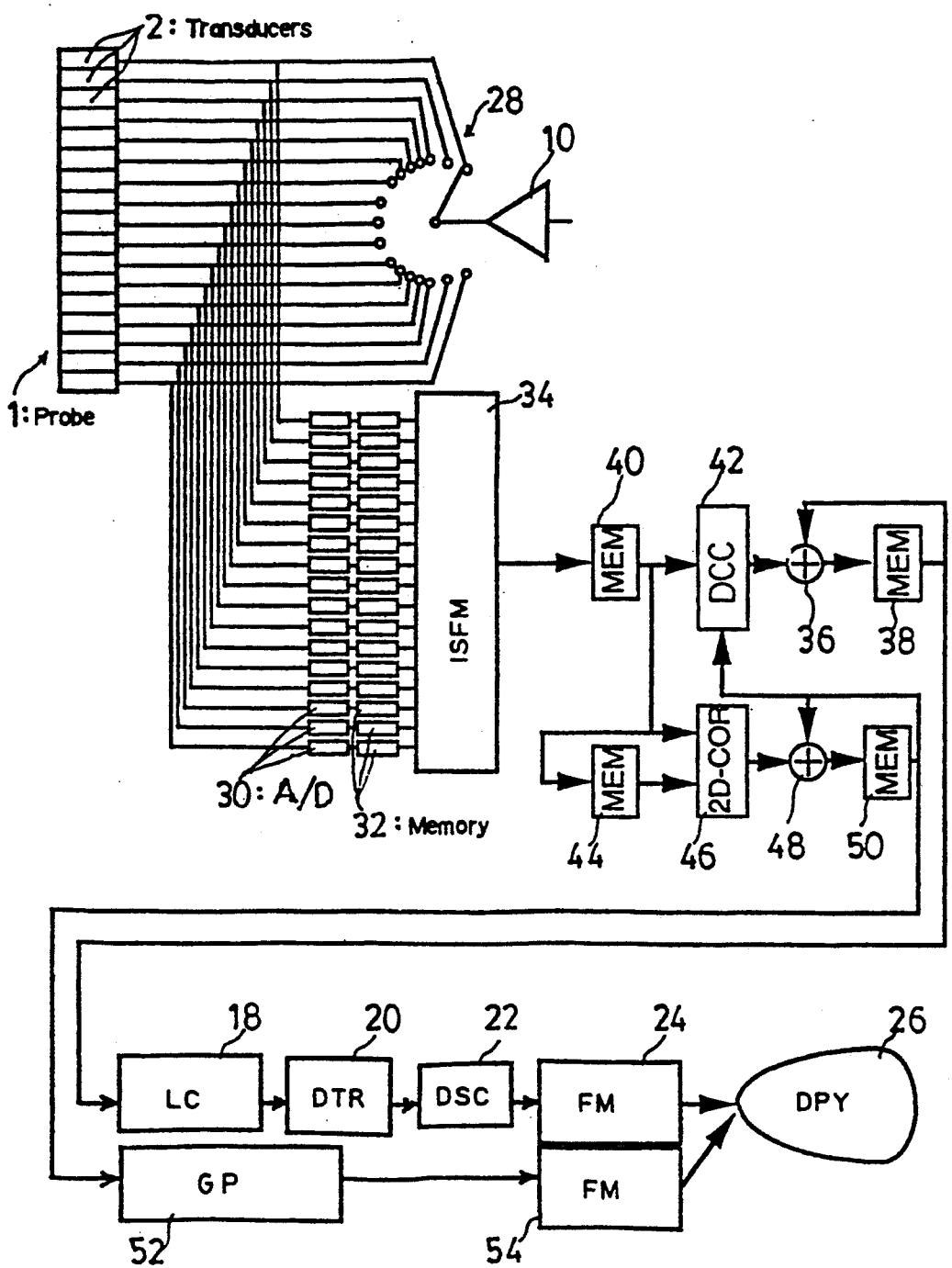
FIG. 1 is a block diagram of an ultrasonic synthetic aperture diagnostic apparatus in a first embodiment according to the present invention having, in combination, the functions of the ultrasonic synthetic aperture diagnostic apparatuses in the first and second aspects of the present invention.
Figure 2:
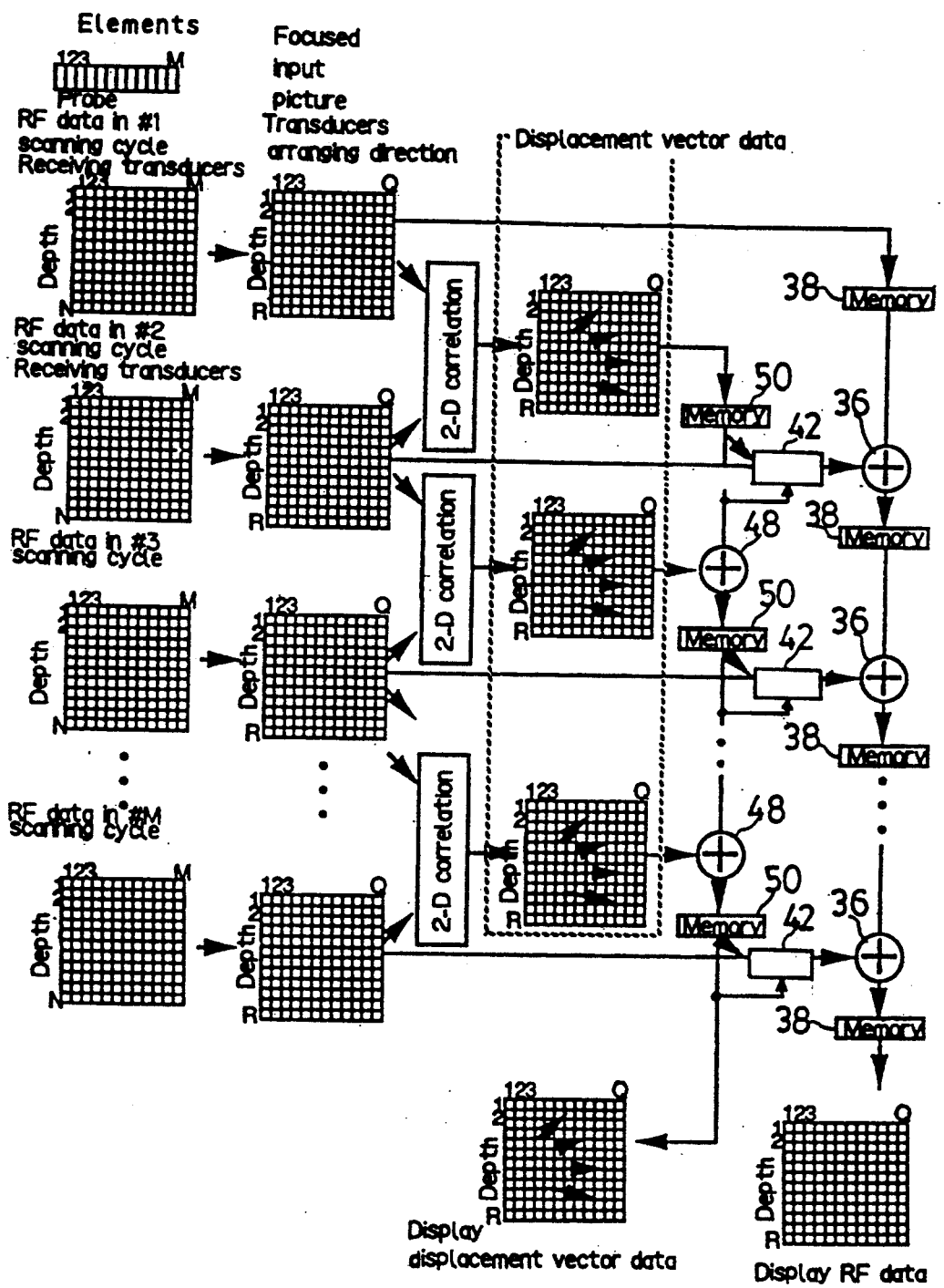
FIG. 2 is a diagrammatic view of assistance in explaining the operation of the ultrasonic synthetic aperture diagnostic apparatus of FIG. 1.
Figure 13:
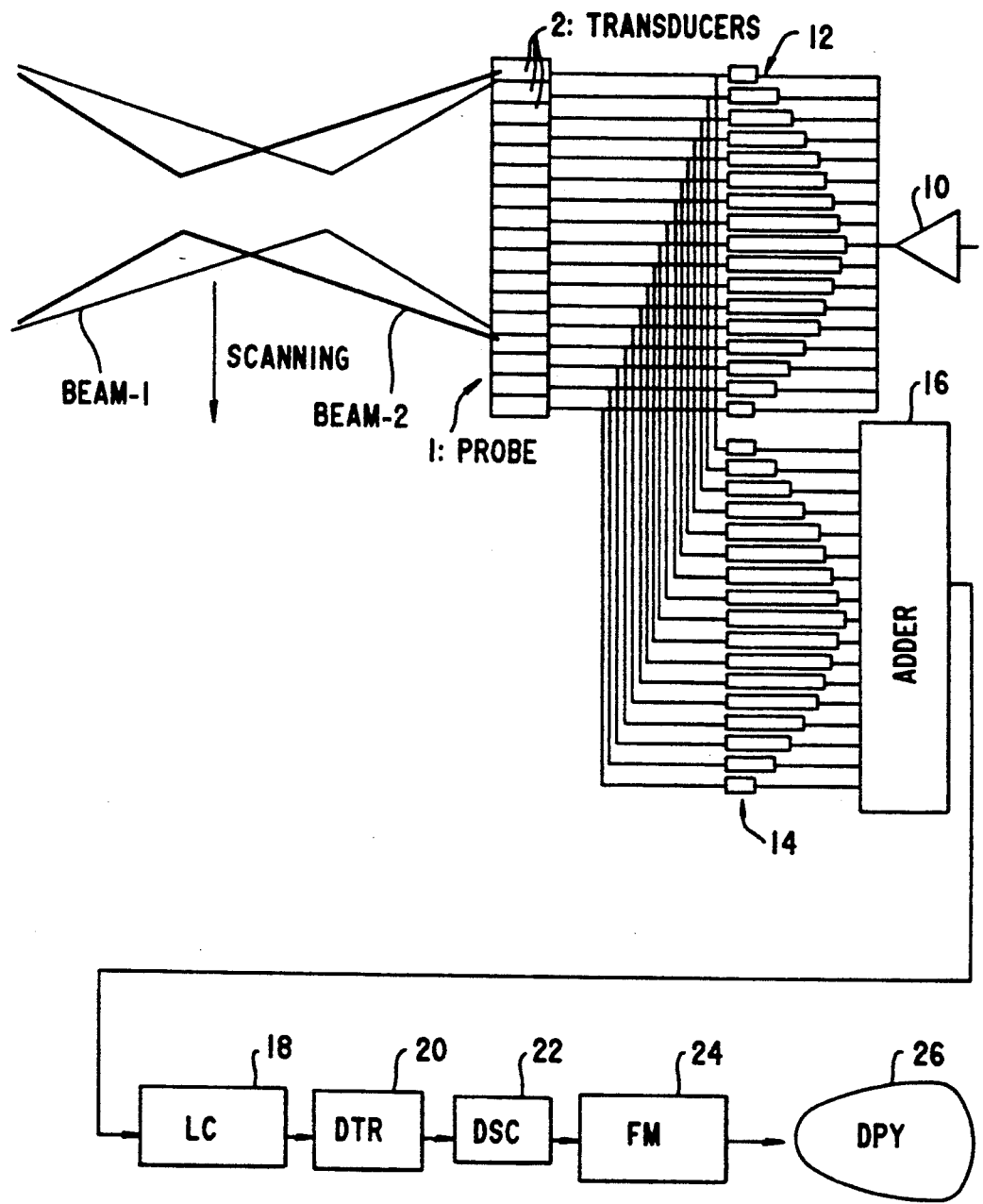
FIG. 13 is a block diagram of a ultrasonic diagnostic apparatus.
Figure 14:
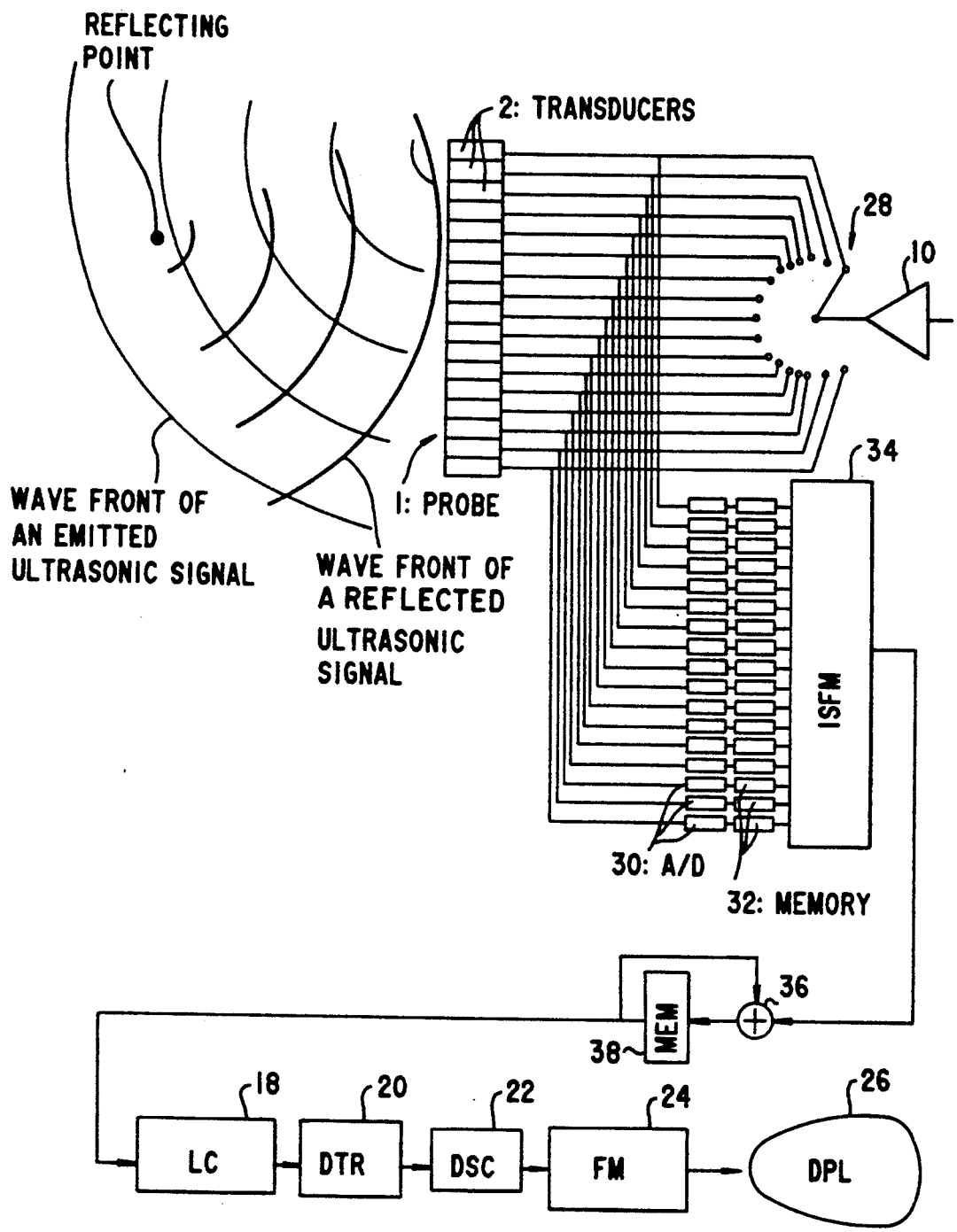
FIG. 14 is a block diagram of a prior art ultrasonic synthetic aperture diagnostic apparatus.
Figure 15:
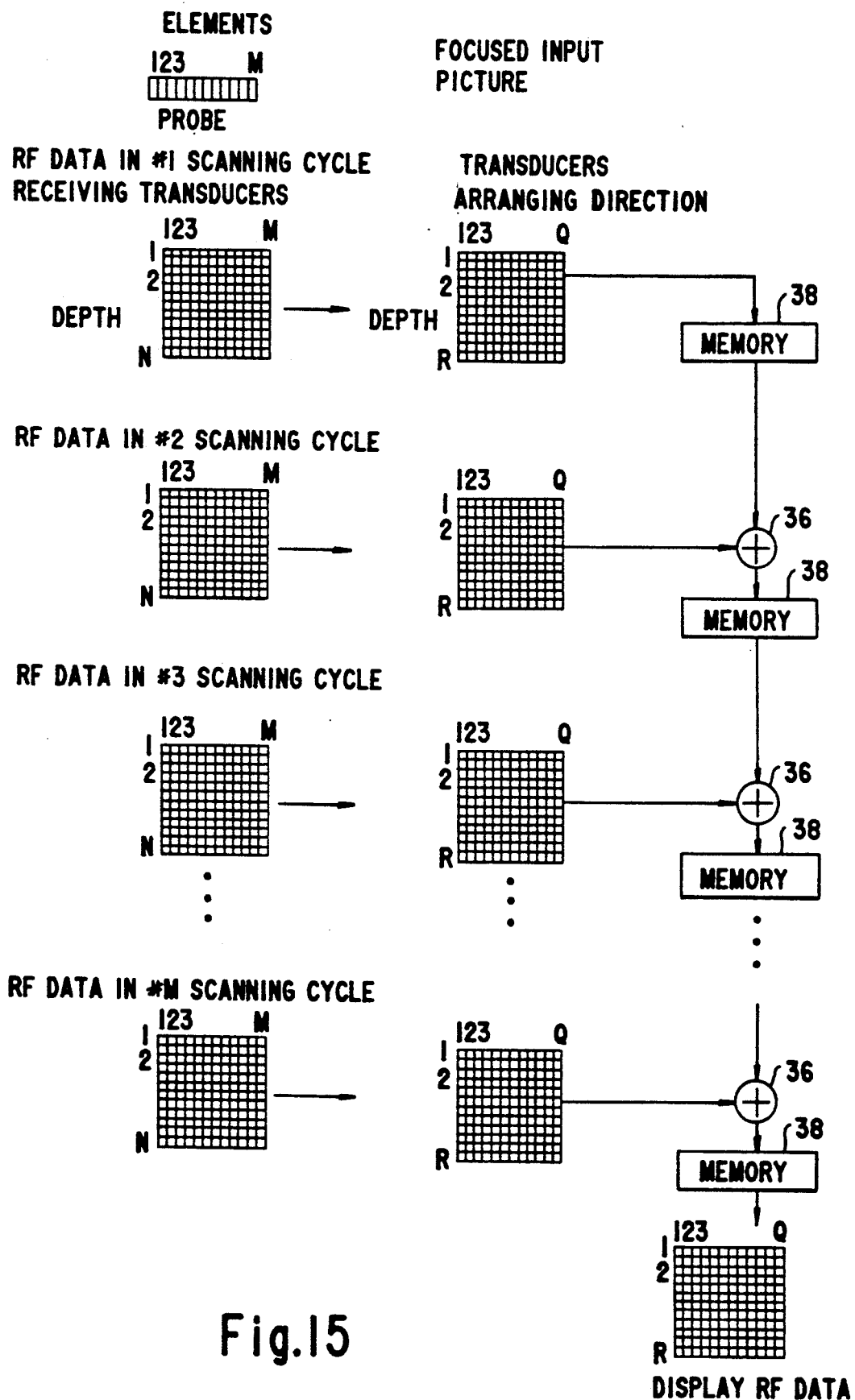
FIG. 15 is a diagrammatic view of assistance in explaining the operation of the ultrasonic synthetic aperture diagnostic apparatus of FIG. 14.

FIG. 1 is a block diagram of an ultrasonic synthetic aperture diagnostic apparatus in a first embodiment according to the present invention having, in combination, the functions of the ultrasonic synthetic aperture diagnostic apparatuses in the first and second aspects of the present invention and FIG. 2 is a diagrammatic view of assistance in explaining the operation of the ultrasonic synthetic aperture diagnostic apparatus of FIG. 1, in which parts like or corresponding to those of the prior art ultrasonic synthetic aperture diagnostic apparatus described previously with reference to FIGS. 13 and 14 are denoted by the same reference characters and the description thereof will be omitted to avoid duplication.

Referring to FIG. 1, an ultrasonic pulse signal emitted by an uppermost transducer 2, as viewed in FIG. 1, is reflected by an internal structure of an object to be inspected, not shown, and the ultrasonic echo is received by a plurality of transducers 2, the plurality of transducers 2 provides input signals, and AD converters 30 converts the input signals into corresponding digital input signals and stores the digital input signals temporarily in memories 32. The digital input signals are read from the memories 32 and applied to an input signal focusing means 34. The input signal focusing means 34, similarly to the input signal focusing means of the foregoing prior art ultrasonic synthetic aperture diagnostic apparatus shown in FIGS. 13 and 14, delays the digital input signals and adds the delayed signals to each other so that R picture elements are formed in the direction of depth, i.e., the direction parallel to the scanning line in a desired region and 0 picture elements (Q scanning lines) are formed in the direction of arrangement of the transducers 2 to form a first focused input picture. The first focused input picture is stored temporarily in a memory 40.

The first focused input picture is read from the memory 40 and transferred to a memory 44 and through a displacement correcting circuit 42 and an adder 36 to a memory 38.

Then, a switching circuit 28 is controlled to emit an ultrasonic pulse signal by the second transducer 2 from the top, as viewed in FIG. 1, and then the input signal focusing means 34 operates an digital input signal corresponding to the ultrasonic pulse signal to form a second focused input picture. The focused input picture is stored in the memory 40. After the focused input picture obtained in the preceding ultrasonic scanning cycle has been stored in the memory 44 and the focused input picture obtained in the succeeding ultrasonic scanning cycle has been stored in the memory 40, a two-dimensional cross-correlation calculating circuit 46, i.e., a displacement measuring means, calculates the two-dimensional cross-correlation between the two focused input pictures to measure the displacement vector of each picture element of the focused input picture formed in the succeeding ultrasonic scanning cycle and stored in the memory 40 relative to the corresponding picture element of the focused input picture formed in the preceding ultrasonic scanning cycle and stored in the memory 44.

Figure 3A:
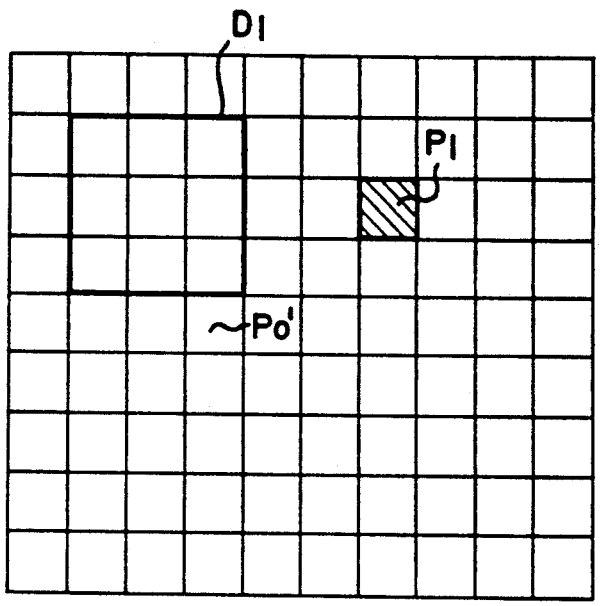
FIGS. 3(a) and 3(b) are diagrammatic views of two focused input pictures, of assistance in explaining the calculation of cross-correlation.
Figure 3B:
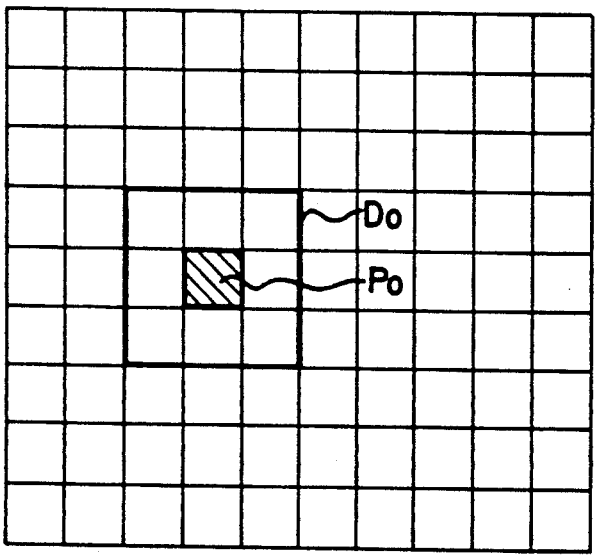
Figure 4:
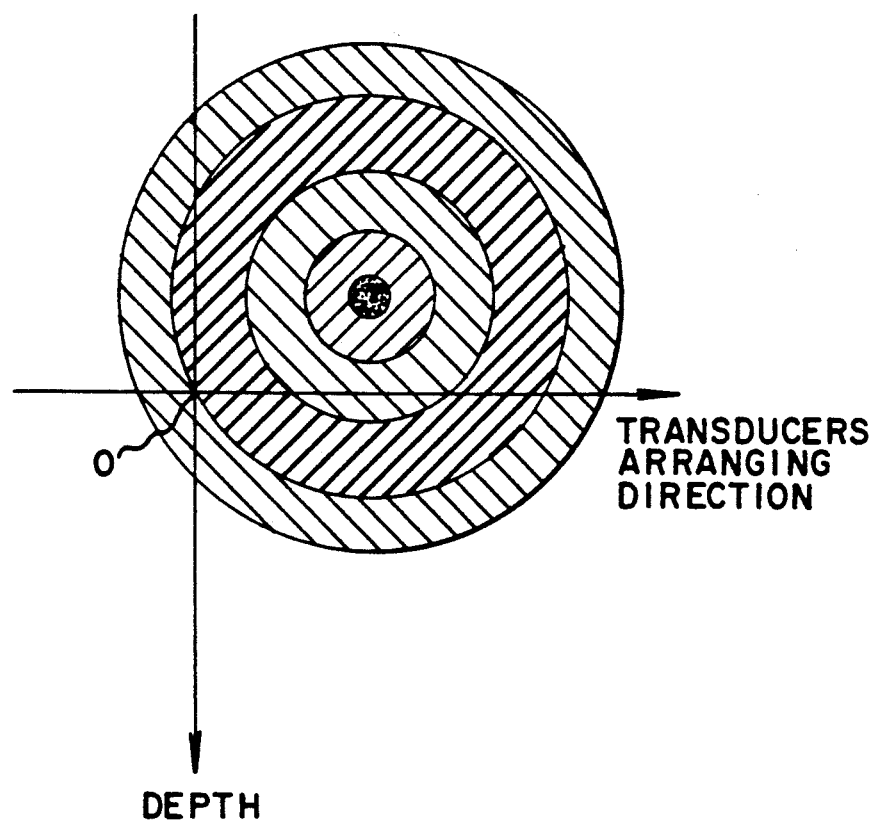
FIG. 4 is a graph typically showing the results of calculation of cross-correlation.
Figure 5:
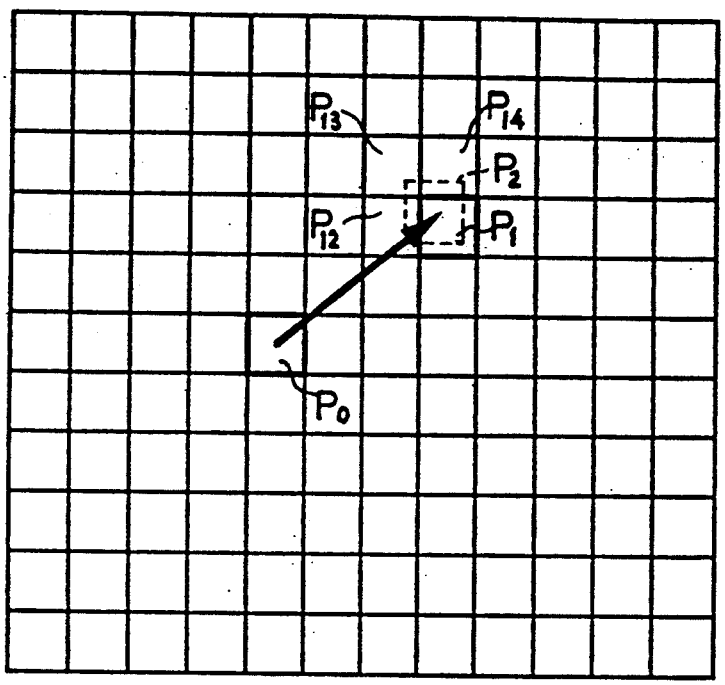
FIG. 5 is a diagrammatic view of a displacement vector determined on the basis of the coordinates of the maximum value of cross-correlation.

FIGS. 3(a) and 3(b) are diagrammatic views of assistance in explaining the calculation of cross-correlation, FIG. 4 is a graph showing the results of cross-correlation calculation and FIG. 5 is a diagram showing a displacement vector determined from the coordinates of the maximum value of cross-correlation. In FIGS. 3(a), 3(b) and 5, each square corresponds to a picture element.

The nth focused input picture as shown in FIG. 3(b) formed on the nth ultrasonic scanning cycle is stored in the memory 44. Operation for determining the displacement of a picture $P_0$ represented by a shaded square in the focused input picture of FIG. 3(b) will be described by way of example. The (n+1)th focused input picture formed in the (n+1)th ultrasonic scanning cycle as shown in FIG. 3(a) is stored in the memory 40. Suppose that a part of the object corresponding to the picture element $P_0$ of the nth focused input picture shown in FIG. 3(b) has moved to a position corresponding to a picture element $P_1$ of the (n+1)th focused input picture shown in FIG. 3(a). In this stage, it is unknown whether or not a part of an object corresponding to the picture element $P_0$ has shifted to the picture element $P_1$.

A region $D_0$ surrounding the picture element $P_0$ is determined for the focused input picture stored in the memory 44, a region $D_1$ is set near a picture element $P_0'$ corresponding to the picture element $P_0$ for the focused input picture stored in the memory 40 and the location of the region $D_1$ is changed successively with the region $D_0$ fixed to calculate the two-dimensional cross-correlation between data representing the corresponding picture elements in the regions $D_0$ and $D_1$. Suppose that the picture element values of the picture elements in the regions $D_0$ and $D_1$ are represented by $D_0(x, y)$ and $D_1(s, y)$, respectively. Then the value of the two-dimensional cross-correlation calculated in a region of $3 \times 3$ squares around the picture element $P_0$ represented by coordinates $(x_0, y_0)$ is expressed by $$R_{x_0 y_0}(\zeta, \eta) = \sum_{y=-1}^{+1} \sum_{x=-1}^{+1} D_1(X_0 + X, y_0 + y) D_1(X_0 + X + \zeta, y_0 + y + \eta)$$

As shown in FIG. 4, the result of calculation of the two-dimensional cross-correlation is a function having a peak at a position deviating from the origin O. The deviation of the peak from the origin O shows the displacement of a part of the object corresponding to the picture element $P_0$ shown in FIG. 3(b). Namely, when FIG. 4 and FIG. 3(b) are superposed with the origin O coinciding with the picture element $P_0$, a vector extending from the picture element $P_0$ to the peak as shown in FIG. 5 represents the displacement of the picture element $P_0$. The vector is understood that a part of the object situated at the position corresponding to a picture element $P_0$ of the nth focused input picture when the nth ultrasonic wave for obtaining the nth picture is emitted and reflected in the object moves to the location corresponding to the tip point of the vector when the (n+1)th ultrasonic wave for obtaining the (n+1)th focused input picture is emitted and reflected in the object. For simplicity, in this specification, the movement of the object or a part of the object is expressed as the movement of the picture or of the picture element of the picture. The two-dimensional cross-correlation calculating circuit 46 (FIG. 1) carries out the foregoing calculation for all the picture elements of the focused input picture, alternating the picture element $P_0$ sequentially.

Referring again to FIGS. 1 and 2, displacement vectors for all the picture elements of the second focused input picture determined by the two-dimensional cross-correlation calculating circuit 46 are transferred through the adder 48 to and stored in the memory 50. The displacement vectors stored in the memory 50 are applied to the displacement correcting circuit 42. The displacement correcting circuit 42 corrects the respective displacements of the picture elements of the second focused input picture stored in the memory 40 so that the second focused input picture coincides with the first focused input picture. The adder 36 adds the each picture element of the second displacement-corrected focused input picture and the corresponding each picture element of the first focused input picture stored in the memory 38 to provide an added focused input picture. The first focused input picture stored in the memory 38 is cleared and the added focused input picture is stored in the memory 38. The second focused input picture is transferred from the memory 40 to the memory 44, and the displacement vectors stored in the memory 50 are applied to a graphics processor 52.

Figure 6:
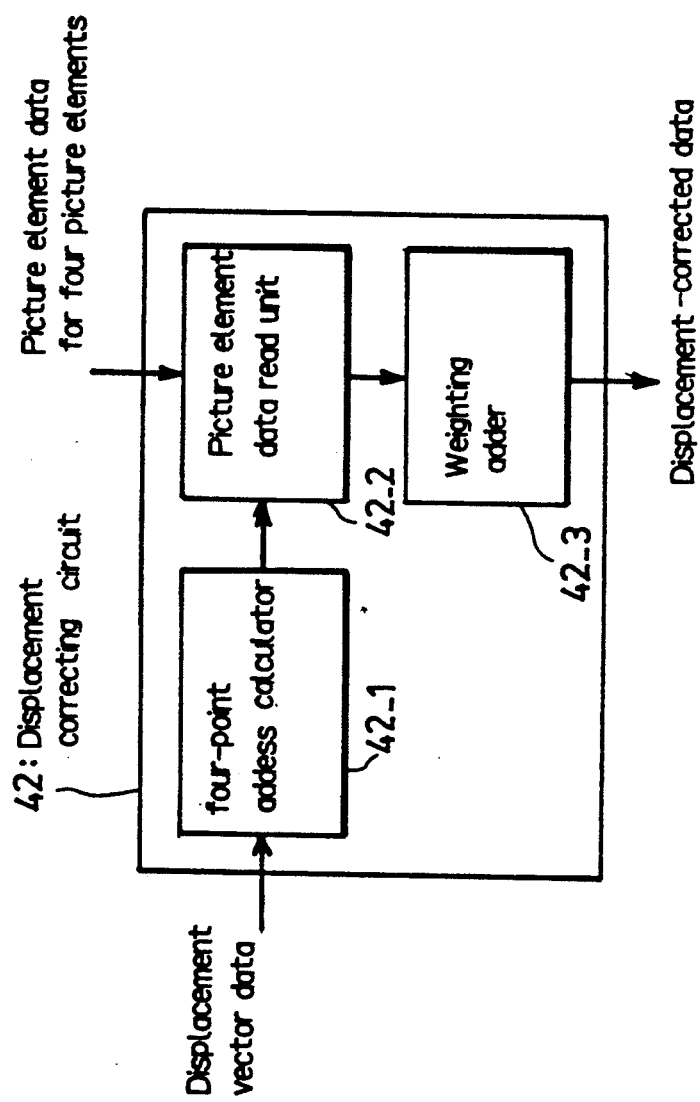
FIG. 6 is a block diagram of a displacement correcting circuit included in the ultrasonic synthetic aperture diagnostic apparatus of FIG. 1.

Although it is assumed for simplicity that the picture element $P_0$ (to describe accurately, a part of the object situated at the position corresponding to the picture element $P_0$) shifts to the position of the picture element $P_1$ (to the position corresponding to the picture element $P_1$) (FIGS. 3(a), 3(b) and 5), generally, the new position of the picture element $P_0$ does not coincide with a square and is dislocated from squares as represented by a picture element $P_2$ indicated by broken lines in FIG. 5. Accordingly, the displacement correcting circuit 42 determines, by the following procedure, displacement-corrected data for the picture element $P_2$. FIG. 6 is a block diagram of the displacement correcting circuit 42 shown in FIG. 1. Displacement vector data, namely, data representing the coordinates of the terminating point of the vector shown in FIG. 5, is applied to a four-point address calculator 42_1 of the displacement correcting circuit 42. The four-point address calculator 42_1 calculates addresses for four picture elements $P_{11}$, $P_{12}$, $P_{13}$ and $P_{14}$ around the terminating point of the vector represented by the coordinates. Address data representing the respective addresses of the four picture elements $P_{11}$, $P_{12}$, $P_{13}$ and $P_{14}$ are applied to a picture element data read unit 42_2. Then, the picture element data read unit 42_2 reads picture element data of the four picture elements $P_{11}$, $P_{12}$, $P_{13}$ and $P_{14}$ and gives the same to an weighting adder 42_3. The weighting adder 42_3 weights the picture element data properly and adds the weighted picture element data to determine displacement-corrected data for the picture element $P_2$ (FIG. 5).

Then, the switching circuit 28 is controlled again to make the third transducer 2 from the top, as viewed in FIG. 1, emit an ultrasonic pulse signal. The input signal focusing means 34 provides a third focused input picture formed on the basis of input signals corresponding ultrasonic echoes, and the focused input picture is stored in the memory 40. Then, the two-dimensional cross-correlation calculating circuit 46 calculates the cross-correlation between the second focused input picture stored in the memory 44 and the third focused input picture stored in the memory 40 to determine displacement vectors representing the respective displacements of the picture elements between the two successive focused input pictures by the foregoing procedure. Since the displacement vectors representing the respective displacements of the picture elements between the first and second focused input pictures are stored previously in the memory 50, the adder 48 adds the displacement vectors stored previously in the memory 50 and the corresponding new displacement vectors determined by the two-dimensional cross-correlation calculating circuit 46. The displacement vectors previously stored in the memory 50 are cleared and the new displacement vectors, i.e., integrated displacement vectors, are stored in the memory 50. Thus, the integrated displacement vectors stored in the memory 50 indicate the respective displacements of the picture elements from the corresponding picture elements of the focused input picture obtained in the first ultrasonic scanning cycle, which will be referred to as a reference picture.

The displacements of the picture elements of the third focused input picture are corrected in the displacement correcting circuit 42 by using the integrated displacement vectors stored in the memory 50 so that the third focused input picture will coincides with the reference picture. The adder 36 adds the picture elements of the third displacement-corrected focused input picture and the corresponding picture elements of the picture formed by adding the first focused input picture and the second focused input picture to provide new added focused input picture. The new added input picture is stored in the memory 38. The integrated displacement vectors stored in the memory 50 are applied to the graphics processor 52.

The foregoing operation is executed every time the switching circuit 28 is controlled to change the transducer 2 for emitting the ultrasonic pulse signal. After the ultrasonic pulse signals have been sequentially emitted by all the M transducers 2, an integrated picture formed by integrating the M focused input picture is stored in the memory 38. The integrated picture is processed by a logarithmic converter 18, a detector 20 and a digital scan converter 22 and the processed integrated picture is stored in a frame memory 24. On the other hand, the integrated displacement vectors indicating the displacements of the picture elements of the Mth focused input picture from the corresponding picture elements of the reference picture are stored in the memory 50. The integrated displacement vectors are given to the graphics processor 52. As stated above, the integrated displacement vectors of the second, third, . . . and the (M−1)th focused input pictures are given sequentially to the graphics processor 52. The graphics processor 52 produces data for legibly displaying the integrated displacement vectors on a display 26 on the basis of the integrated displacement vectors of the focused input pictures give sequentially thereto, and stores the data in a frame memory 54. After the integrated picture and the data representing the integrated displacement vectors have been stored, respectively, in the frame memories 24 and 54, the integrated picture and the data representing the integrated displacement vectors are read from the frame memories 24 and 54 and displayed on the display 26 in a visible picture formed by superposing the integrated picture and the data representing the integrated displacement vectors.

Figure 7A:
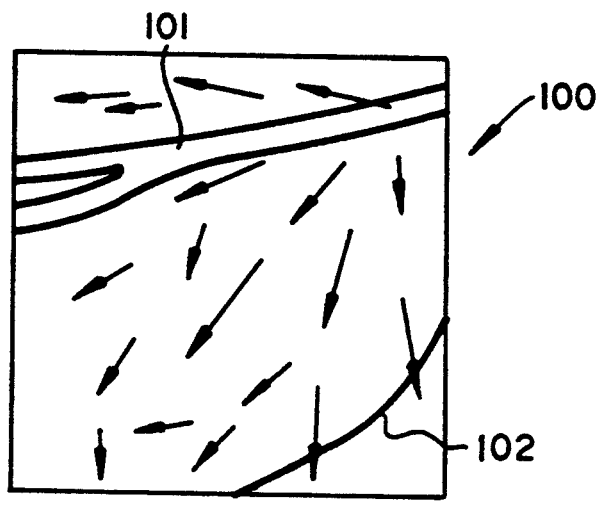
FIGS. 7(a) and 7(b) are pictorial views of assistance in explaining displaying modes.
Figure 7B:
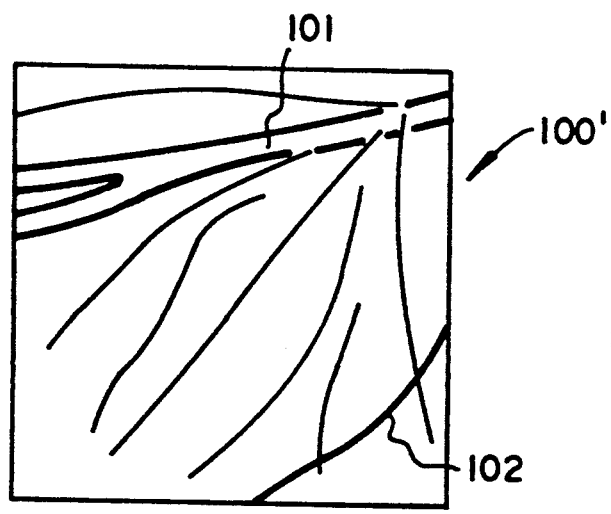

FIGS. 7(a) and 7(b) are pictorial views of examples of pictures displayed on the display 26, assuming an abdominal structure of a human body.

In FIG. 7(a), discrete arrows are displayed on a picture of a blood vessel 101 and the diaphragm 102 displayed on a screen 100. The arrows indicate the minute displacements of discrete points. In FIG. 7(b), stream lines are displayed on a picture, similar to that displayed on the screen 100 in FIG. 7(a), of a blood vessel 101 and the diaphragm 102 displayed on a screen 100'. The stream lines indicate the directions of the integrated displacement vectors of points on the stream lines. Only the magnitude of the integrated displacement vectors of the points may be represented by brightness, saturation of color or lightness of color.

Although the ultrasonic synthetic aperture diagnostic apparatus described above is an embodiment of the ultrasonic synthetic aperture diagnostic apparatus in the fourth aspect of the present invention which displays a picture formed by superposing the integrated picture and the data based on the integrated displacement vectors, naturally, the ultrasonic synthetic aperture diagnostic apparatus may have the functions of the ultrasonic synthetic aperture diagnostic apparatus in the first or second aspect of the present invention which displays an integrated picture or the data based on the integrated displacement vectors.

Figure 8:
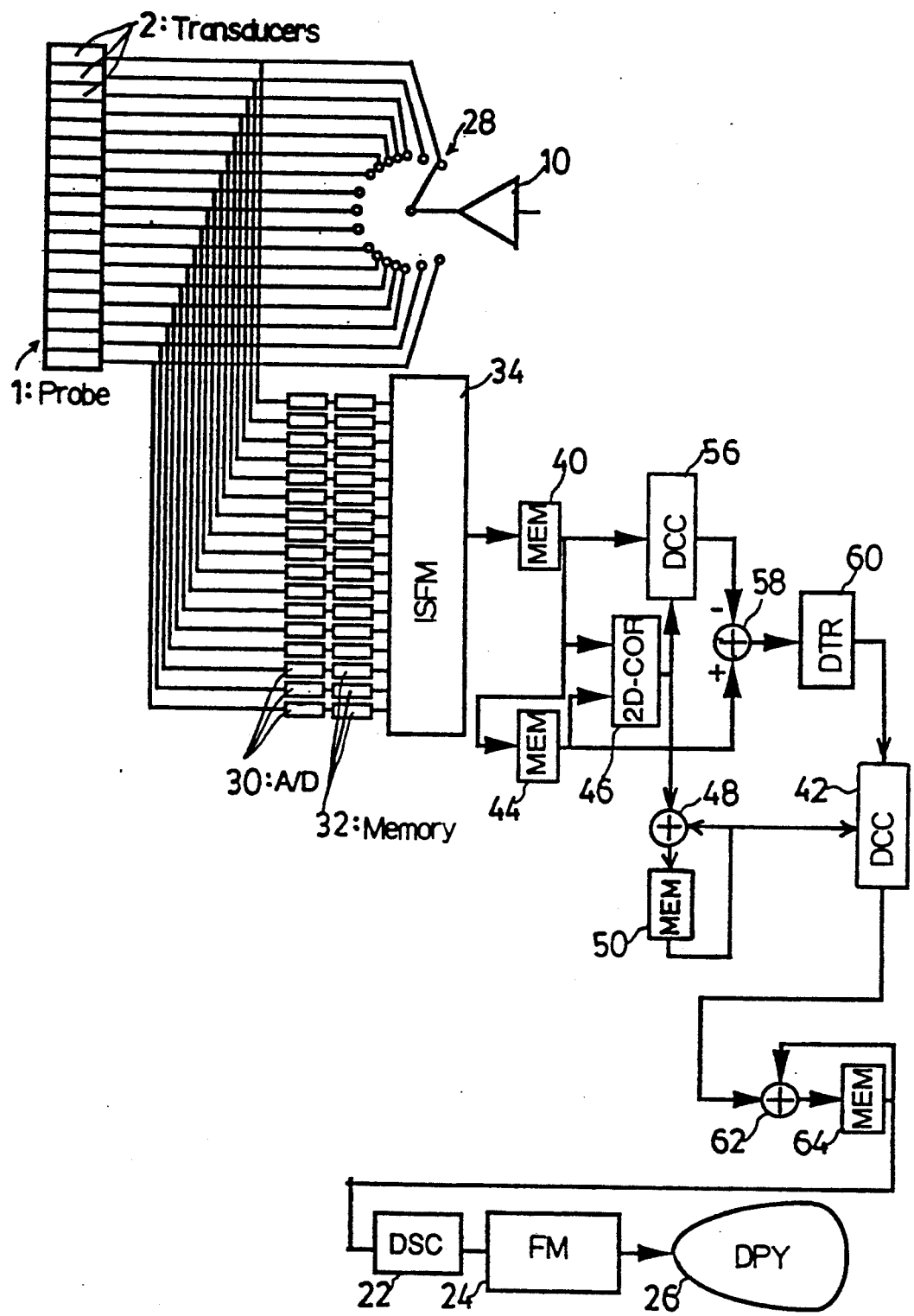
FIG. 8 is a block diagram of an ultrasonic synthetic aperture diagnostic apparatus in a second embodiment according to the present invention having the functions of the ultrasonic synthetic aperture diagnostic apparatus in the third aspect of the present invention.
Figure 9:
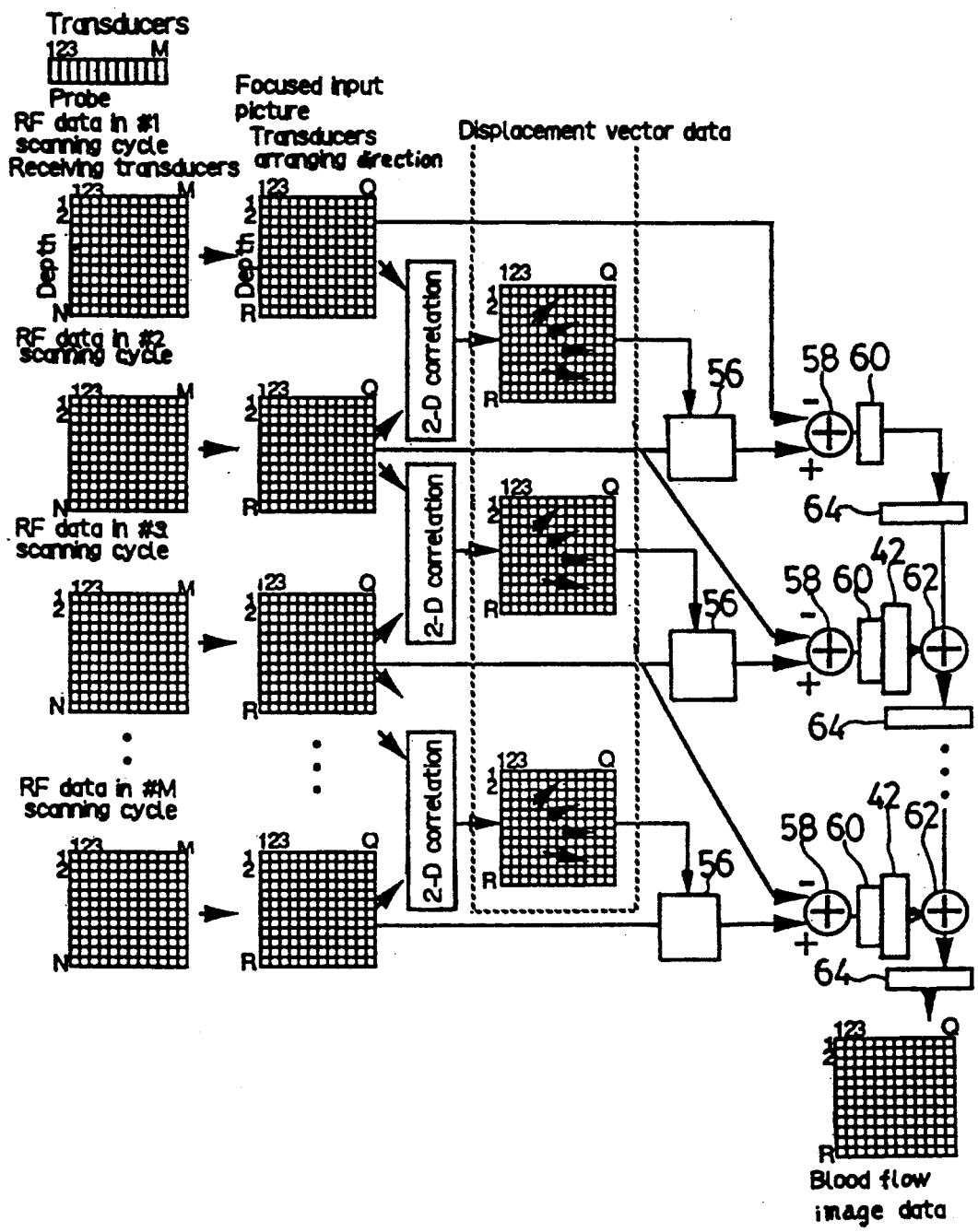
FIG. 9 is a diagrammatic view of assistance in explaining the operation of the ultrasonic synthetic aperture diagnostic apparatus of FIG. 8.

FIG. 8 is a block diagram of an ultrasonic synthetic aperture diagnostic apparatus in a second embodiment according to the present invention corresponding to the ultrasonic synthetic aperture diagnostic apparatus in the third aspect of the present invention, and FIG. 9 is a diagrammatic view of assistance in explaining the operation of the ultrasonic synthetic aperture diagnostic apparatus of FIG. 8, in which parts like or corresponding to those of the ultrasonic synthetic aperture diagnostic apparatus shown in described with reference to FIGS. 1 and 2 are denoted by the same reference characters and the description thereof will be omitted to avoid duplication.

A two-dimensional cross-correlation calculating circuit 46 calculates the two-dimensional cross-correlation between the (n−1)th focused input picture stored in a memory 44 and the nth focused input picture stored in a memory 40 to determined displacement vectors of picture elements. An adder 48 adds the displacement vectors determined by the two-dimensional cross-correlation calculating circuit 46 and integrated displacement vectors stored previously in a memory 50 to provide new integrated displacement vectors obtained by sequentially integrating the displacements of picture elements from those of a reference picture, i.e., a focused input picture formed in the first ultrasonic scanning cycle. The new integrated displacement vectors are stored in the memory 50.

The displacement vectors determined by the two-dimensional cross-correlation calculating circuit 46 are given also to a displacement correcting circuit 56. The displacement correcting circuit 56 corrects the displacement so that the nth focused input picture stored in the memory 44 will agree with the (n−1)th focused input picture stored in the memory 44. The nth displacement-corrected focused input picture thus obtained and the (n−1)th focused input picture stored in the memory 44 are subjected to subtraction by a subtracter 58, only amplitude information is extracted by a detector 60 to obtain an amplitude difference picture. The amplitude difference picture is given to a displacement correcting circuit 42. The amplitude difference picture represents the difference between two displacement-corrected focused input pictures. Therefore, the displacement of each tissue of the body is corrected and erased, while the displacement of blood streams or the like is not corrected and remains as errors in correcting displacements of the picture elements in the amplitude difference picture. The integrated displacement vectors stored in the memory 50 also are given to the displacement correcting circuit 42, and the displacement of the amplitude difference picture is corrected with reference to the reference picture. The displacement-corrected amplitude difference pictures are added sequentially by an adder 62 to obtain an integrated amplitude difference picture. The integrated amplitude difference picture is stored in a memory 64.

A digital scan converter 22 converts the integrated amplitude difference picture into display data and the display data is stored temporarily in a memory 24. The integrated amplitude difference picture is displayed later in a visible picture on a display 26. As stated above, the integrated amplitude difference picture is formed by integrating the displacement-corrected focused input pictures and hence blood streams or the like are conspicuous in the visible picture regardless of the direction of flow of the blood streams or the like.

Although this ultrasonic synthetic aperture diagnostic apparatus is provided with the two displacement correcting circuits 56 and 42 to correct the displacement between the amplitude difference pictures again after obtaining the amplitude difference pictures by correcting the displacement between the two focused input pictures from which the amplitude difference picture is to be obtained, the ultrasonic synthetic aperture diagnostic apparatus may be provided with only one displacement correcting circuit and may determine the amplitude difference pictures after correcting the displacements of all the focused input pictures.

Although this ultrasonic synthetic aperture diagnostic apparatus determines and displays only the integrated amplitude difference picture, naturally, this ultrasonic synthetic aperture diagnostic apparatus may incorporate the functions of the ultrasonic synthetic aperture diagnostic apparatus illustrated in FIG. 1 to display an integrated picture, i.e., a tomogram of an internal structure of the object, in combination with the integrated amplitude difference picture.

Figure 10:
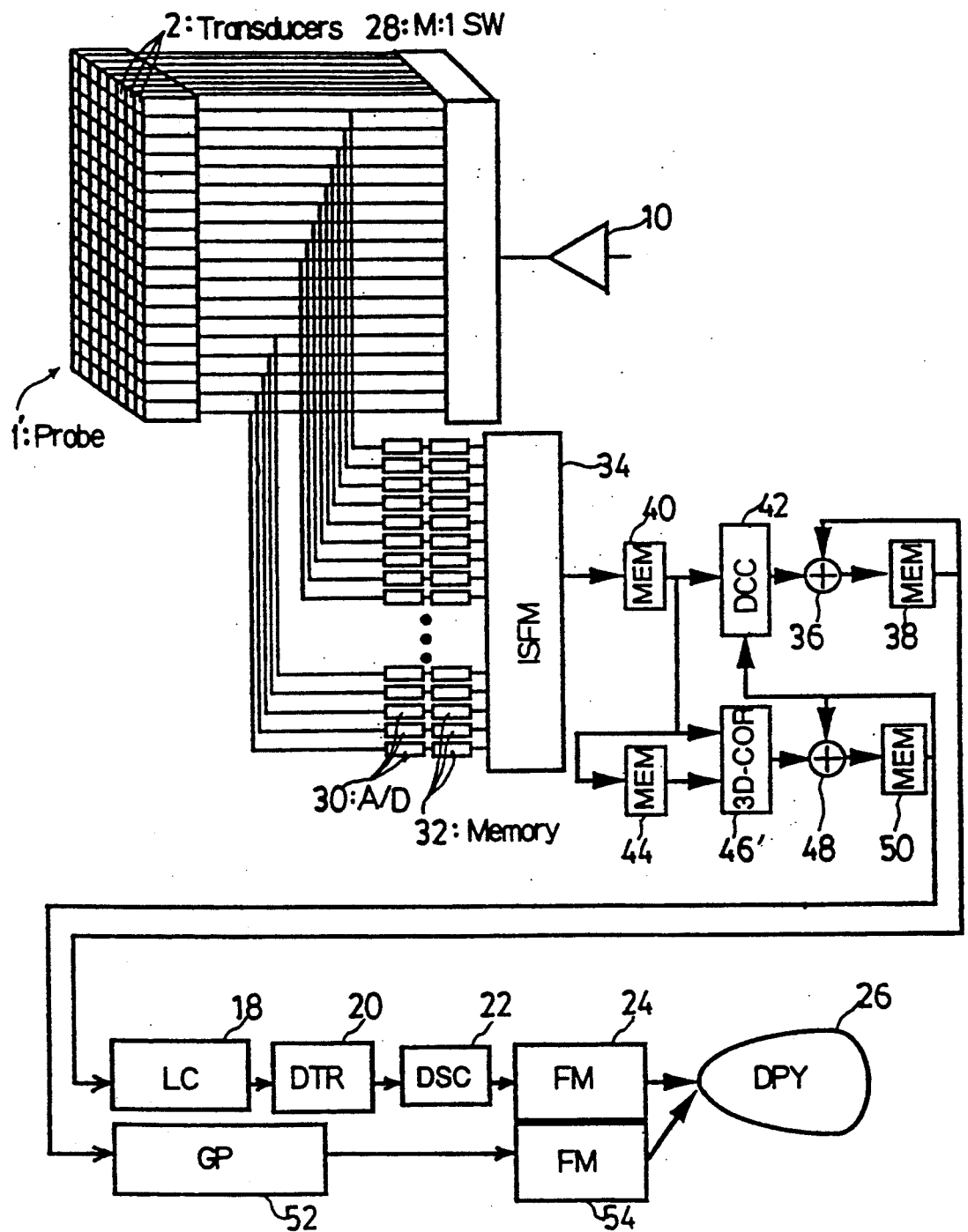
FIG. 10 is a block diagram of a synthetic aperture diagnostic apparatus in a third embodiment according to the present invention having, in combination, the functions of the ultrasonic synthetic aperture diagnostic apparatuses in the first and second aspects of the present invention.
Figure 11:
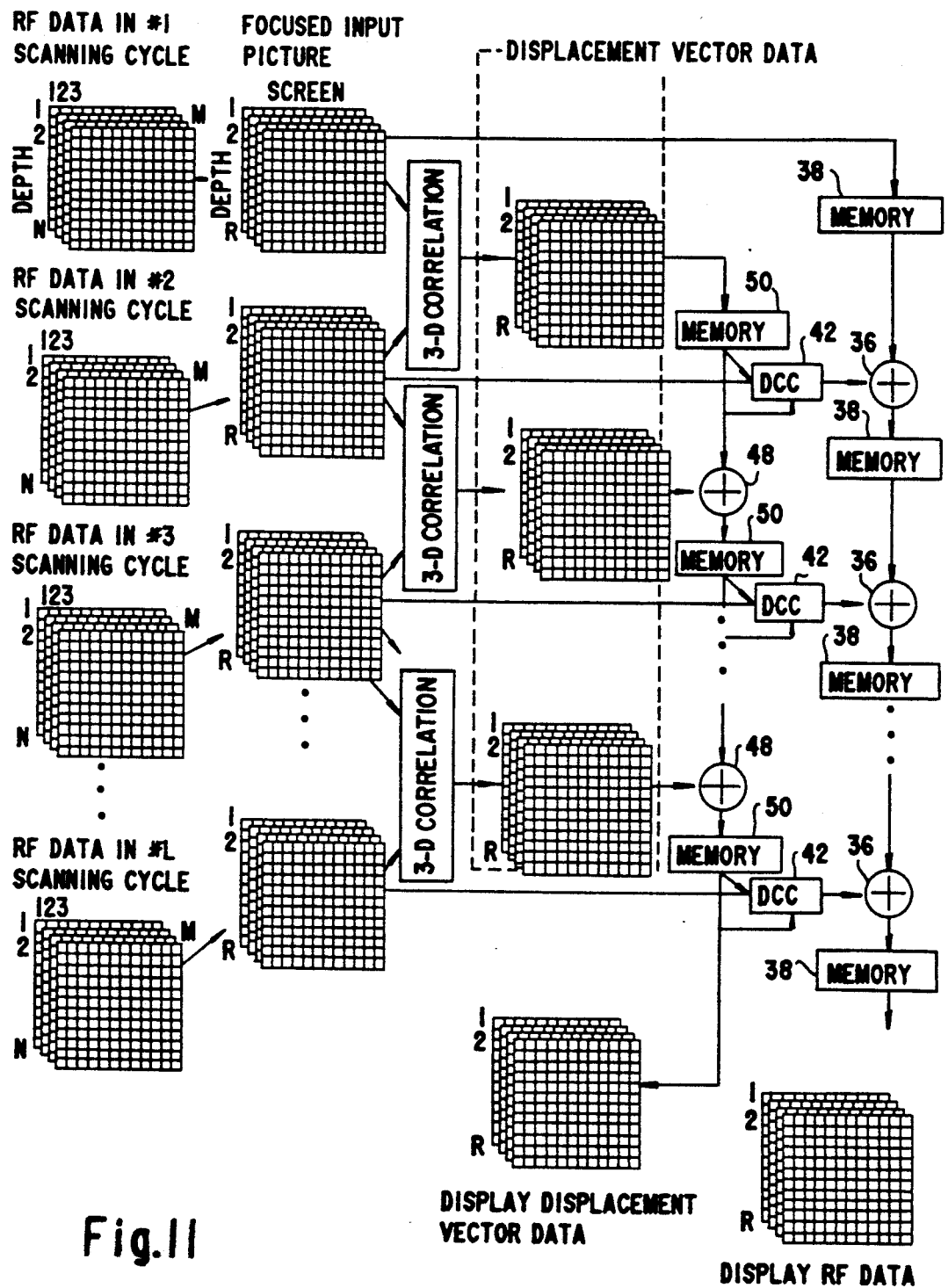
FIG. 11 is a diagrammatic view of assistance in explaining the operation of the ultrasonic synthetic aperture diagnostic apparatus of FIG. 10.

FIG. 10 is a block diagram of an ultrasonic synthetic aperture diagnostic apparatus in a third embodiment according to the present invention having the functions of the ultrasonic synthetic aperture diagnostic apparatuses in the first and second aspect of the present invention and FIG. 11 is a diagrammatic view of assistance in explaining the operation of the ultrasonic synthetic aperture diagnostic apparatus of FIG. 10, in which blocks like or corresponding to those shown in and described with reference to FIGS. 1 and 2 are denoted by the same reference characters and the description thereof will be omitted. However, the configurations of the components of the ultrasonic synthetic aperture diagnostic apparatus in the third embodiment are not necessarily the same as those of the components of the ultrasonic synthetic aperture diagnostic apparatus shown in FIGS. 1 and 2, and the components of the former ultrasonic synthetic aperture diagnostic apparatus are constructed for three-dimensional measurement.

The ultrasonic synthetic aperture diagnostic apparatus is provided with a probe 1' consisting of a plurality of transducers 2 arranged in a two-dimensional arrangement. An input signal focusing means 34 provides a three-dimensional focused input picture through calculation on the basis of input signals provided by the transducers 2 arranged in a two-dimensional array. The ultrasonic synthetic aperture diagnostic apparatus is provided with a three-dimensional cross-correlation calculating circuit 46' instead of the two-dimensional cross-correlation calculating circuit 46 of FIG. 1. The three-dimensional cross-correlation calculating circuit 46' calculates the three-dimensional cross-correlation between the (n−1)th focused input picture stored in a memory 44 and the nth focused input picture stored in a memory 40 to determine displacement vectors indicating the three dimensional displacements of picture elements between the two focused input pictures. The operations of the blocks in FIG. 10 are similar to that of corresponding blocks in FIGS. 1 and 2. The ultrasonic synthetic aperture apparatus displays an integrated picture, data representing the integrated displacement vectors or a picture formed by superimposing the integrated picture and the data representing the integrated displacement vectors on a display 26.

The displaying mode is not limited to any particular one; a predetermined two-dimensional section may be displayed or a three-dimensional structure may be displayed in a perspective picture.

Figure 12:
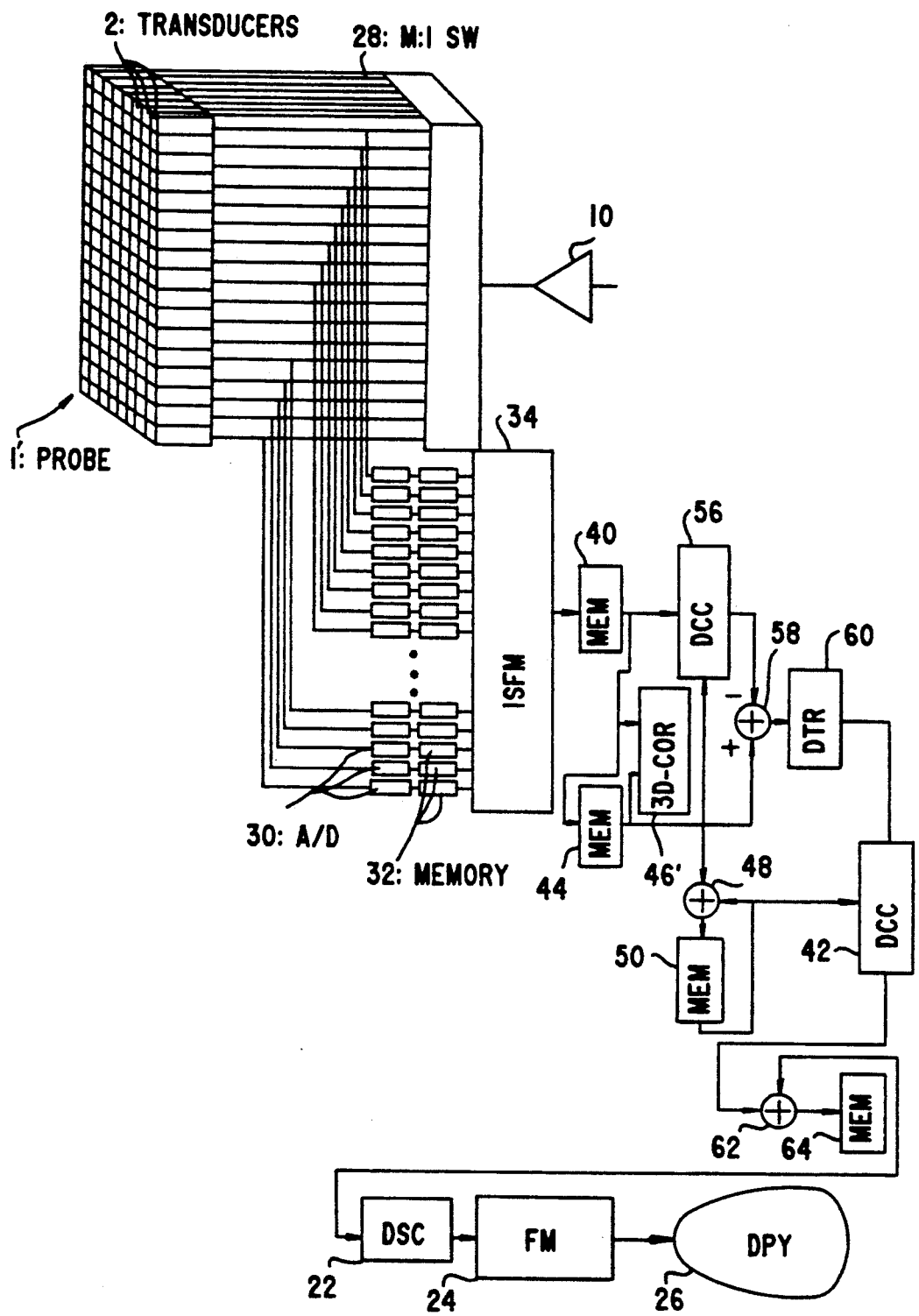
FIG. 12 is a block diagram of a synthetic aperture diagnostic apparatus in a fourth embodiment according to the present invention having the functions of the ultrasonic synthetic aperture diagnostic apparatus in the third aspect of the present invention.

FIG. 12 is a block diagram of an ultrasonic synthetic aperture diagnostic apparatus in a fourth embodiment according to the present invention. This ultrasonic synthetic aperture diagnostic apparatus is formed by extending the ultrasonic synthetic aperture diagnostic apparatus shown in FIG. 8, for three-dimensional measurement. In FIG. 12, blocks like or corresponding to those shown in FIG. 8 are denoted by the same reference characters and the description thereof will be omitted to avoid duplication.

The synthetic aperture diagnostic apparatus shown in FIG. 12, similarly to that shown in FIG. 10, is provided with a probe 1' consisting of a plurality of transducers 2 arranged in a two-dimensional arrangement. An input signal focusing means 34 provides through calculation a three-dimensional focused input picture of the internal structure of an object on the basis of input signals provided by the transducers 2 arranged in a two-dimensional arrangement. A three-dimensional cross-correlation calculating circuit 46', similarly to that shown in FIG. 10, determines three-dimensional displacement vectors of picture elements in two focused input pictures stored, respectively, in two memories 40 and 44. The rest of steps of operation of the ultrasonic synthetic aperture diagnostic apparatus is the same as those of operation of the ultrasonic synthetic aperture diagnostic apparatus shown in FIG. 8 and hence the description thereof will be omitted.

The ultrasonic synthetic aperture diagnostic apparatus in the fourth embodiment may display, on a display 26, a picture of a predetermined section or a perspective picture of a three-dimensional structure.

The present invention is not limited in its application to an ultrasonic synthetic aperture apparatus for two-dimensional measurement, the same is applicable also to an ultrasonic synthetic aperture diagnostic apparatus for three-dimensional measurement.

What is claimed is:

1. An ultrasonic synthetic aperture diagnostic apparatus, which detects information concerning an internal structure of an object to be examined by making each of a plurality of arranged transducers sequentially emits an ultrasonic pulse signal into the object in turn, receiving each ultrasonic echo reflected by the internal structure of the object by the plurality of transducers in each ultrasonic scanning cycle, and obtaining information concerning the internal structure of the object on the basis of input signals provided by the plurality of transducers, comprising:

an input signal focusing means which forms a focused input picture of the entire area of a desired field of view within the object on the basis of the input signals provided by the transducers in each ultrasonic scanning cycle;

a displacement measuring means which determines displacement vectors indicating the displacements of the picture elements between two focused input pictures obtained in two ultrasonic scanning cycles for a plurality of focused input pictures;

a displacement integrating means which determines integrated displacement vectors indicating the displacements of the picture elements of a focused input picture from those of a predetermined reference focused input picture by integrating displacement vectors of the corresponding picture elements in a plurality of focused input pictures;

a displacement correcting means which corrects the displacements of the picture elements of each focused input picture with reference to the corresponding picture elements of the predetermined reference focused input picture to obtain displacement-corrected focused input pictures;

a picture integrating means which obtains an integrated picture by integrating the displacement-corrected focused input pictures; and an integrated picture displaying means which displays the integrated picture.

2. An ultrasonic synthetic aperture diagnostic apparatus according to claim 1, wherein said displacement measuring means determines the displacement vector representing the displacement of each picture element on the basis of the coordinates of the maximum value of cross-correlation determined through the calculation of the cross-correlation between the two focused input pictures.

3. An ultrasonic synthetic aperture diagnostic apparatus according to claims 1, wherein said displacement measuring means determines the displacement vector representing the displacement of each picture element through the calculation of the optical flow between the two focused input pictures.

4. An ultrasonic synthetic aperture diagnostic apparatus, which detects information concerning an internal structure of an object to be examined by making each of a plurality of arranged transducers sequentially emits an ultrasonic pulse signal into the object in turn, receiving each ultrasonic echo reflected by the internal structure of the object by the plurality of transducers in each ultrasonic scanning cycle, and obtaining information concerning the internal structure of the object on the basis of input signals provided by the plurality of transducers, comprising:

an input signal focusing means which forms a focused input picture of the entire area of a desired field of view within the object on the basis of the input signals provided by the transducers in each ultrasonic scanning cycle;

a displacement measuring means which determines displacement vectors indicating the displacements of the picture elements between two focused input pictures obtained in two ultrasonic scanning cycles for a plurality of focused input pictures;

a displacement integrating means which determines integrated displacement vectors indicating the displacements of the picture elements of a focused input picture from those of a predetermined reference focused input picture by integrating displacement vectors of the corresponding picture elements in a plurality of focused input pictures; and
an integrated displacement displaying means which displays data based on the integrated displacement vectors.

5. An ultrasonic synthetic aperture diagnostic apparatus according to claim 4, wherein said displacement measuring means determines the displacement vector representing the displacement of each picture element on the basis of the coordinates of the maximum value of cross-correlation determined through the calculation of the cross-correlation between the two focused input pictures.

6. An ultrasonic synthetic aperture diagnostic apparatus according to claim 4, wherein said displacement measuring means determines the displacement vector representing the displacement of each picture element through the calculation of the optical flow between the two focused input pictures.

7. An ultrasonic synthetic aperture diagnostic apparatus, which detects information concerning an internal structure of an object to be examined by making each of a plurality of arranged transducers sequentially emits an ultrasonic pulse signal into the object in turn, receiving each ultrasonic echo reflected by the internal structure of the object by the plurality of transducers in each ultrasonic scanning cycle, and obtaining information concerning the internal structure of the object on the basis of input signals provided by the plurality of transducers, comprising;
an input signal focusing means which forms a focused input picture of the entire area of a desired field of view within the object on the basis of the input signals provided by the transducers in each ultrasonic scanning cycle;
a displacement measuring means which determines displacement vectors indicating the displacements of the picture elements between two focused input pictures obtained in two ultrasonic scanning cycles;
a displacement integrating means which determines integrated displacement vectors indicating the displacements of the picture elements of a focused input picture from those of a predetermined reference focused input picture by integrating displacement vectors of the corresponding picture elements in a plurality of focused input pictures;
an amplitude difference extracting means which obtains a plurality of amplitude difference pictures by sequentially extracting information representing the amplitude difference between the corresponding picture elements of the two displacement-corrected focused input pictures from the plurality of focused input pictures;
an amplitude difference picture integrating means which obtains an integrated amplitude difference picture by integrating the plurality of displacement-corrected amplitude difference pictures; and
an integrated amplitude difference picture displaying means which displays the integrated amplitude difference picture.

8. An ultrasonic synthetic aperture diagnostic apparatus according to claim 7, wherein said displacement measuring means determines the displacement vector representing the displacement of each picture element on the basis of the coordinates of the maximum value of cross-correlation determined through the calculation of the cross-correlation between the two focused input pictures.

9. An ultrasonic synthetic aperture diagnostic apparatus according to claim 7, wherein said displacement measuring means determines the displacement vector representing the displacement of each picture element through the calculation of the optical flow between the two focused input pictures.

10. An ultrasonic synthetic aperture diagnostic apparatus, which detects information concerning an internal structure of an object to be examined by making each of a plurality of arranged transducers sequentially emits an ultrasonic pulse signal into the object in turn, receiving each ultrasonic echo reflected by the internal structure of the object by the plurality of transducers in each ultrasonic scanning cycle, and obtaining information concerning the internal structure of the object on the basis of input signals provided by the plurality of transducers, comprising:
an input signal focusing means which forms a focused input picture of the entire area of a desired field of view within the object on the basis of the input signals provided by the transducers in each ultrasonic scanning cycle;
a displacement measuring means which determines displacement vectors indicating the displacements of the picture elements between two focused input pictures obtained in two ultrasonic scanning cycles for a plurality of focused input pictures; and
a displacement integrating means which determines integrated displacement vectors indicating the displacements of the picture elements of a focused input picture from those of a predetermined reference focused input picture by integrating displacement vectors of the corresponding picture elements in a plurality of focused input pictures, said ultrasonic synthetic aperture diagnostic apparatus further comprising:
at least one of:
an integrated picture calculating means comprising a displacement correcting means which corrects the displacements of the picture elements of each focused input picture with reference to the predetermined reference focused input picture to obtain a displacement-corrected focused input picture and a picture integrating means which obtains an integrated picture by integrating the displacement-corrected focused input pictures; and
an integrated amplitude difference picture calculating means comprising an amplitude difference extracting means which obtains a plurality of amplitude difference pictures by sequentially extracting information representing the amplitude difference between the corresponding picture elements of the two displacement-corrected focused input pictures from the plurality of focused input pictures and an amplitude difference picture integrating means which obtains an integrated amplitude difference picture by integrating the plurality of displacement-corrected amplitude difference pictures, said ultrasonic synthetic aperture diagnostic apparatus further comprising:
a composite picture displaying means for displaying at least two pieces of information among the integrated picture obtained by the picture integrating means, data based on the integrated displacement vectors obtained by the displacement integrating means, and the integrated amplitude difference picture obtained by the amplitude difference picture integrating means, in a superposed picture.

* * * * *